United States Patent Office 3,065,131
Patented Nov. 20, 1962

3,065,131
IMPROVEMENT IN NITROFURAN SOLUTIONS
William Henry Ray, Ashland, Ohio, assignor to Richardson-Merrell Inc., New York, N.Y., a corporation of Delaware
No Drawing. Filed Oct. 30, 1961, Ser. No. 148,718
10 Claims. (Cl. 167—53)

This invention relates to new compositions of matter and to methods of using the same.

A large number of 2-substituted-5-nitrofurans have been described which have activity against a broad spectrum of pathogenic bacteria, protozoa, and fungi. Several of these are in widespread use for the prevention and treatment of enteric infections in animals, particularly those caused by intestinal parasites of the Salmonella group such as *Salmonella typhimurium, S. paratyphi, S. choleraesuis, S. dublin* and the like. These micro-organisms infect a large number of different kinds of animals such as chickens, turkeys, ducks, swine, cattle, sheep, dogs, and cause huge losses. Prophylactic and therapeutic treatment of the animals is commonly undertaken by including one of the effective nitrofurans in the animals' diet.

Because some animals stop eating when they become ill, but continue to drink water, it is preferred that the drug be administered in the drinking water. In the case of most of the nitrofurans, however, it is inconvenient, or virtually impossible to dissolve them in water in therapeutic concentrations on account of their low solubility. Some of the most effective nitrofurans, for instance, have a solubility in water of only 1 part in 25,000. Although attempts have been made to solubilize the therapeutically effective nitrofurans, results have not been completely satisfactory.

The present invention is based upon my discovery that relatively concentrated solutions of therapeutically effective nitrofurans can be prepared in a non-toxic solvent medium whereby the solutions may be prepared, distributed and conveniently dispersed in the animals' drinking water at effective levels without difficulty. The present invention makes it possible to utilize nitrofurans in veterinary medicine with the broadest possible effectiveness in the prevention and control of enteric infections.

I have discovered that the carbonate esters of polyhydric alcohols having vicinal hydroxyl groups are excellent solvents for the nitrofurans and, being non-toxic, they can be used to prepare solutions suitable as vehicles for administration of these therapeutic agents. They may be administered parenterally, at suitable dosage levels, or quickly dispersed or dissolved in water to provide solutions of desired concentrations which the animal may drink ad libitum to obtain prophylactic or therapeutic medication. One of the most effective of these carbonate esters as a solvent for the nitrofurans is ethylene carbonate. Other related carbonate esters having the structure:

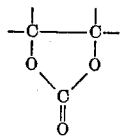

such as propylene carbonate, glycerol carbonate, and the like may also be used as solvents in preparing the new solutions of the present invention. Since ethylene carbonate is a solid at ordinary temperatures, having a freezing point of 36° C., the preferred compositions of the present invention contain one or more miscible solvents so that the solution is a liquid. Equal proportions of ethylene carbonate and glycerol carbonate will, for instance, form solutions which are readily poured from a container and dispersed in water. Particularly suitable solvent combinations include 2 to 9 parts by weight of ethylene carbonate mixed with 1 to 8 parts by weight of propylene carbonate. The most effective solvent combination appears to be 3 parts by weight of ethylene carbonate for each two parts by weight of propylene carbonate.

A number of therapeutically effective solutions prepared in accordance with the present invention will now be illustrated. In general, the preparation of the new solutions of the present invention involves first mixing the ethylene carbonate with glycerine carbonate or propylene carbonate with agitation to form clear solutions. The nitrofuran is added to this solvent and mixed throroughly to form a solution. Distilled water is then added to the desired volume and the solution is mixed and filtered through a sintered glass filter plate of medium porosity with the aid of a moderate vacuum.

EXAMPLE I

*Furazolidone Solution 0.9% (w./v.)*

N-(5-nitro-2-furfurylidene)-3-amino-2-oxazolidone _____ gm__ 0.90
Ethylene carbonate _____ ml__ 47.50
Glycerine carbonate _____ ml__ 47.50
Distilled water, q.s. 100.00 ml.

This solution may be used directly to treat animals by oral administration or by injection. When administered parenterally, the solution may be given so as to provide about ½ to 5 mgs. of the nitrofuran per kilogram of body weight. The other solutions to be described hereinafter may also be administered orally or parenterally in amounts sufficient to give thereapeutic or prophylactic dosage level as recommended for the particular nitrofuran contained in the solution.

EXAMPLE II

*Furaltadone Solution 5% (w./v.)*

N-(5-nitro-2-furfurylidene)-3-amino-5-(N'-morpholinylmethyl)-2-oxazolidone _____ gm__ 5.0
Glycerine carbonate _____ ml__ 75.0
Distilled water, q.s. 100.0 ml.

Furaltadone has proven to be one of the most effective of the nitrofurans in the treatment of Salmonella infections when administered in drinking water. For some reason not presently known, the administration of therapeutic nitrofurans in drinking water appears to have a biological advantage in that it is more effective than when equal amounts of the drug are incorporated in the animals' feed.

The above solution is conveniently dispersed in water to provide furaltadone levels of 0.0025 to 0.05% by weight to be administered ad libitum for the prophylactic or therapeutic control of salmonellosis, coccidiosis and other enteric infections.

The following described solutions may also be dispersed in the drinking water of animals to be treated with the nitrofuran in a similar manner at desired dosage levels.

EXAMPLE III

*Furaltadone Solution 10% (w./v.)*

A particularly effective solvent for the nitrofurans is prepared by mixing 4 parts by volume propylene carbonate with 6 parts by volume ethylene carbonate. This solution which may be prepared as described above is composed of the following:

N-(5-nitro-2-furfurylidene)-3-amino-5-(N'-morpholinylmethyl)-2-oxazolidone _____ gm__ 10.0
Solvent combination (4 parts propylene carbonate plus 6 parts ethylene carbonate), q.s. 100.0 ml.

It too may be readily dispersed in the animals' drinking water to provide solutions of desired dosage levels.

EXAMPLE IV

*Furazolidone Solution 1.5% (w./v.)*

N-(5-nitro-2-furfurylidene)-3-amino-2-oxazolidone gm__ 1.5
Solvent combination (4 parts propylene carbonate plus 6 parts ethylene carbonate), q.s. 100.0 ml.

EXAMPLE V

Several different nitrofurans may be included in the same solution if desired to obtain the particular advantages of each. One such example is as follows:

```
                                                        Gm.
N-(5-nitro-2-furfurylidene)-3-amino-5-(N'-morpho-
   linylmethyl)-2-oxazolidone _____  8.7
N-(5-nitro-2-furfurylidene)-1-amino-2-pyrroli-
   done _____  1.25
```
Solvent combination (4 parts propylene carbonate plus 6 parts ethylene carbonate), q.s. 100.00 ml.

Similarly, solutions containing up to about 15% by weight of therapeutic agent can be prepared with other nitrofurans as, for instance, the following:

5-nitro-2-furaldehyde semicarbazone (Nitrofurazone);
5-nitro-2-furaldehyde acetylhydrazone (Nihydrazone);
5-nitro-2-furaldehyde-2-(2-hydroxyethyl)-semicarbazone (Nidroxyzone);
N-(5-nitro-2-furfurylidene)-1-amino hydantoin (Nitrofurantoin);
N-5-(5-nitro-2-furfurylidene)-1-amino-2-pyrrolidone;
N-(5-nitro-2-furfurylidene)-1-amino-2-imidazolidone;
N-(5-nitro-2-furfurylidene)-1-amino-2-imidazolidine-thione;

and still others.

The above-named nitrofurans and others which are effective against pathogenic micro-organisms and which may be dissolved in the carbonate esters are described in U.S. Patents 2,610,181; 2,416,234; 2,742,462; 2,802,002; and others. All are intended to be included within the scope of the present invention. These compounds are generally characterized as being 5-nitrofurfurylidene derivatives of the formula:

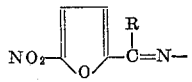

in which R is hydrogen or a lower alkyl group. The substituent on the nitrogen atom may vary considerably as will be seen from the patents referred to. However, a number of other therapeutically effective 5-nitrofurans have been described which are substituted at the 2-position with other groups and can be dissolved in the carbonate esters. Apparently the nature of the side chain at this position has little effect on the solubility of these compounds in the carbonate esters which are powerful solvents. The present invention is intended to include, therefore, all therapeutically effective 2-substituted-5-nitrofurans when dissolved in carbonate esters of polyhydric alcohols.

I claim:

1. A composition of matter comprising a solution of a therapeutically effective 2-substituted 5-nitrofuran dissolved in a non-toxic carbonate of the group consisting of ethylene carbonate, propylene carbonate, glycerin carbonate and mixtures thereof.

2. A composition of matter comprising a solution of a therapeutically effective 5-nitrofurfurylidene dissolved in a carbonate of the group consisting of ethylene carbonate, propylene carbonate, glycerine carbonate and mixtures thereof.

3. A composition of matter comprising a solution of furazolidone in ethylene carbonate.

4. A composition of matter comprising a solution of furaltadone in ethylene carbonate.

5. A composition of matter comprising a solution of furaltadone in ethylene carbonate and glycerine carbonate.

6. A composition of matter comprising furazolidone dissolved in a solvent comprising three parts by weight of ethylene carbonate and two parts by weight of propylene carbonate.

7. A composition of matter comprising furaltadone dissolved in a solvent comprising three parts by weight of ethylene carbonate and two parts by weight of propylene carbonate.

8. A method of preparing medicated drinking water for the control of enteric infections in animals which comprises adding a solution of a therapeutically effective 5-nitro-2-furfurylidene in a carbonate of the group consisting of ethylene carbonate, propylene carbonate, glycerin carbonate and mixtures thereof to water to provide an aqueous solution containing from 0.0025 to 0.05 percent by weight of the nitrofuran derivative.

9. A method of preparing medicated drinking water for the control of enteric infections in animals which comprises the steps of adding a solution containing from one-half to fifteen percent by weight of furaltadone in a carbonate ester of a polyhydric alcohol of the group consisting of ethylene carbonate, propylene carbonate, and glycerine carbonate and mixtures thereof, to water in amounts sufficient to provide a concentration of from 0.0025 to 0.05 percent by weight of furaltadone.

10. A method of preparing concentrated solutions of therapeutically active 5-nitrofurans which comprises the steps of dissolving from one-half to fifteen percent by weight of a therapeutically effective nitrofuran in a carbonate ester of a polyhydric alcohol of the group consisting of ethylene carbonate, propylene carbonate, glycerin carbonate and mixtures thereof.

No references cited.